(12) United States Patent
Barda

(10) Patent No.: US 7,930,479 B2
(45) Date of Patent: Apr. 19, 2011

(54) SYSTEM AND METHOD FOR CACHING AND RETRIEVING FROM CACHE TRANSACTION CONTENT ELEMENTS

(75) Inventor: Noam Barda, Herzeliya Pitoah (IL)

(73) Assignee: SAP AG, Walldorf (DE)

( * ) Notice: Subject to any disclaimer, the term of this patent is extended or adjusted under 35 U.S.C. 154(b) by 885 days.

(21) Appl. No.: 10/836,521

(22) Filed: Apr. 29, 2004

(65) Prior Publication Data

US 2006/0004825 A1    Jan. 5, 2006

(51) Int. Cl.
G06F 12/00    (2006.01)
G06F 13/00    (2006.01)
G06F 13/28    (2006.01)

(52) U.S. Cl. .................... 711/118; 711/E12.042

(58) Field of Classification Search .................. 707/102; 711/118, E12.042
See application file for complete search history.

(56) References Cited

U.S. PATENT DOCUMENTS

| | | | |
|---|---|---|---|
| 6,249,844 B1 * | 6/2001 | Schloss et al. | 711/122 |
| 6,854,018 B1 * | 2/2005 | Li et al. | 709/240 |
| 2002/0138615 A1 * | 9/2002 | Schmeling | 709/225 |

* cited by examiner

Primary Examiner — Sheng-Jen Tsai
(74) Attorney, Agent, or Firm — Kenyon & Kenyon LLP

(57) ABSTRACT

A system and method for caching and retrieving from cache transaction content elements. Metadata is stored in cache to describe content elements of a transaction, a data retrieval device determines, based on the metadata, whether cache contains a complete copy of a transaction associated with a requested content element, and the data retrieval device returns the requested content element from cache if the complete copy of the associated transaction is in cache.

29 Claims, 6 Drawing Sheets

SYSTEM AND METHOD FOR CACHING AND RETRIEVING FROM CACHE TRANSACTION CONTENT ELEMENTS

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

A content server may provide data to a requesting client, e.g. a web browser, via one or more data retrieval devices, e.g., a proxy server and/or a portal. The data retrieval device may be provided, e.g., to filter data sent to the client, perform operations upon data sent to the client, cache data sent to the client for subsequent requests, etc.

A client may request data from the data retrieval device. The data retrieval device may forward the request to the content server. Alternatively, the data retrieval device may check whether the requested data had been stored in the data retrieval device's local memory, cache, in response to a previous request for the data, e.g. from the same or a different requesting client. If the requested data had been previously cached, the data retrieval device may return to the client a copy of the cached data, instead of retrieving the data from the content server.

The content server may be initialized to operate alternatively in a stateless mode or a stateful mode. In a stateless mode, each request to the content server for data is treated individually. After initialization in the stateless mode, the content server can respond to an independent request for data that is disassociated from any group of data of a data retrieval transaction. In a stateful mode, multiple requests for data are grouped together as part of a single transaction. After initialization in the stateful mode, the content server may not be able to respond to an independent data request, where the data request is disassociated from a transaction. If the content server receives an independent data request in the stateful mode, the content server may return an error message.

While in the stateful mode, a client may terminate data retrieval before the data retrieval device retrieves and stores in cache all associated data of a transaction. When the data retrieval device subsequently receives a request for data of the same transaction, the data retrieval device will initially determine that the cache contains the data since a portion of the data of the transaction is stored in cache. If the requested data is of the portion of the transaction not previously received by the data retrieval device, the data retrieval device will be unable to return the requested data from the cache. Since, only a portion of the transaction data is missing, the data retrieval device will consequently request from the content server the missing data as an independent data request disassociated from the transaction. Since the content server is initialized in the stateful mode for the transaction data, the content server will be unable to return the requested data disassociated from a return of the rest of the transaction data, and will return an error message. The client's request will therefore not be fulfilled.

Accordingly there is a need in the art for a system and/or method to fulfill a request for data of a transaction in the stateful mode where a previous transmission of data of the transaction had been prematurely terminated.

DETAILED DESCRIPTION

Embodiments of the present invention generally relate to cached content element retrieval. More particularly, embodiments relate to ensuring integrity of cached content elements of a transaction before returning the cached content elements.

A client may request from a data retrieval device data grouped in a particular transaction. A transaction is a set of data, e.g., a data file, that includes a number of content elements, e.g., text, graphics, etc., where all content elements of the transaction are associated with one another. A transaction may include one principal content element that has location addresses, e.g., Uniform Resource Identifiers (URI), for example Uniform Resource Locators (URL), to other of the content elements of the transaction. The URLs may be embedded within the principal content element. The content elements and their respective URLs may be arranged according to an hierarchy. For example, the principal content element may include embedded URLs that point to other content elements. These other content elements may also include embedded URLs that point to other sub-content elements, etc. After the principal content element is retrieved, further sequential requests for the sub-content elements may be continuously generated by the URLs until all the content elements of the transaction have been retrieved. The content elements may be coded, e.g., in hyper text markup language (HTML).

Figure 1:
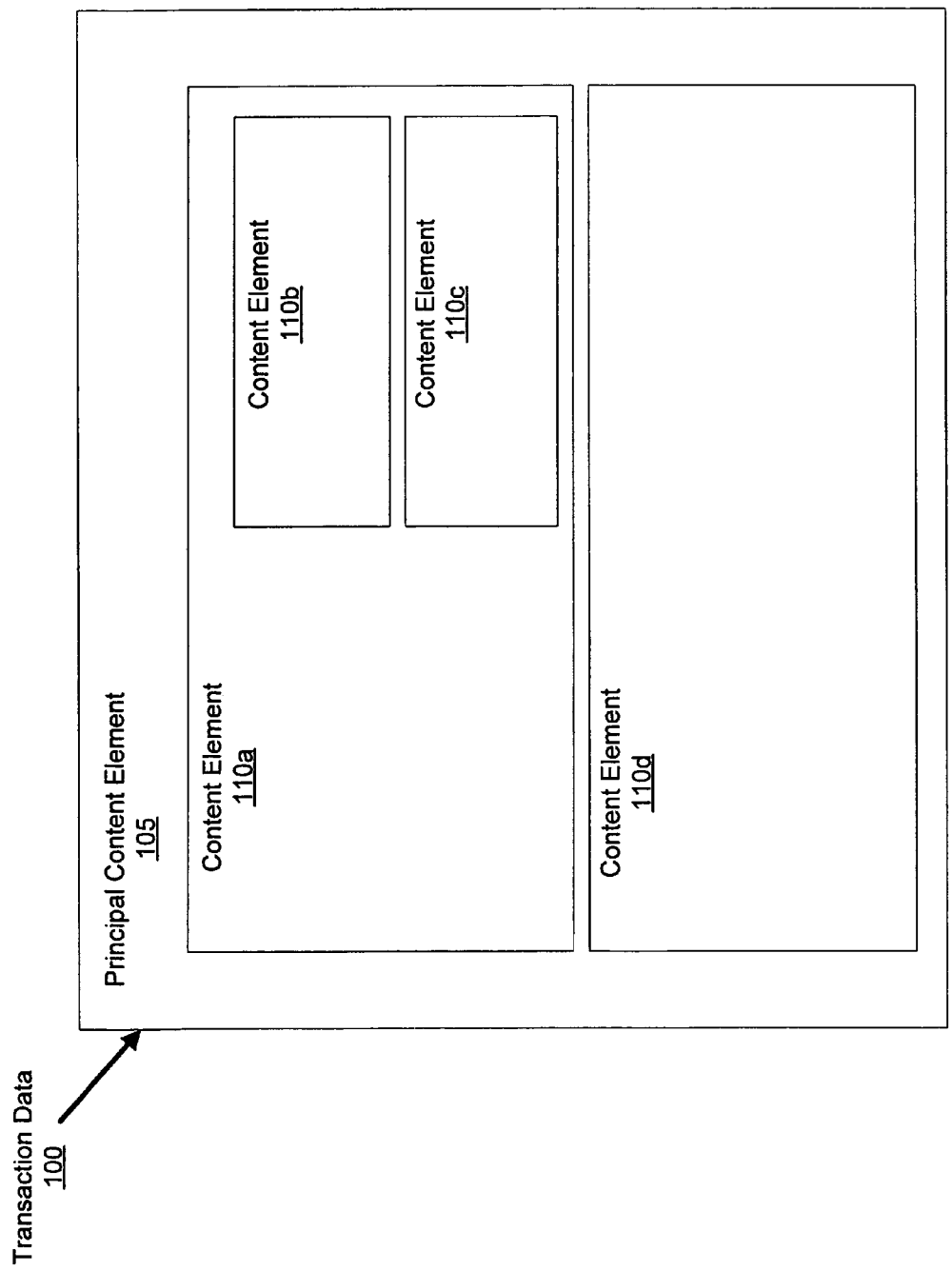
FIG. 1 is a block diagram that illustrates the components of a transaction data, according to an embodiment of the present invention.

FIG. 1 is a block diagram that illustrates an example embodiment of content elements of a transaction after the content elements have been loaded on a graphical user interface. Transaction data 100 may include principal content element 105. Embedded in principal content element 105 may be content element 110*a* and content element 110*d*. Embedded in content element 110*a* may be embedded content element 110*b* and content element 110*c*. Content elements 110*b* and 110*c* may be multiple instances of a particular content element.

Figure 2:
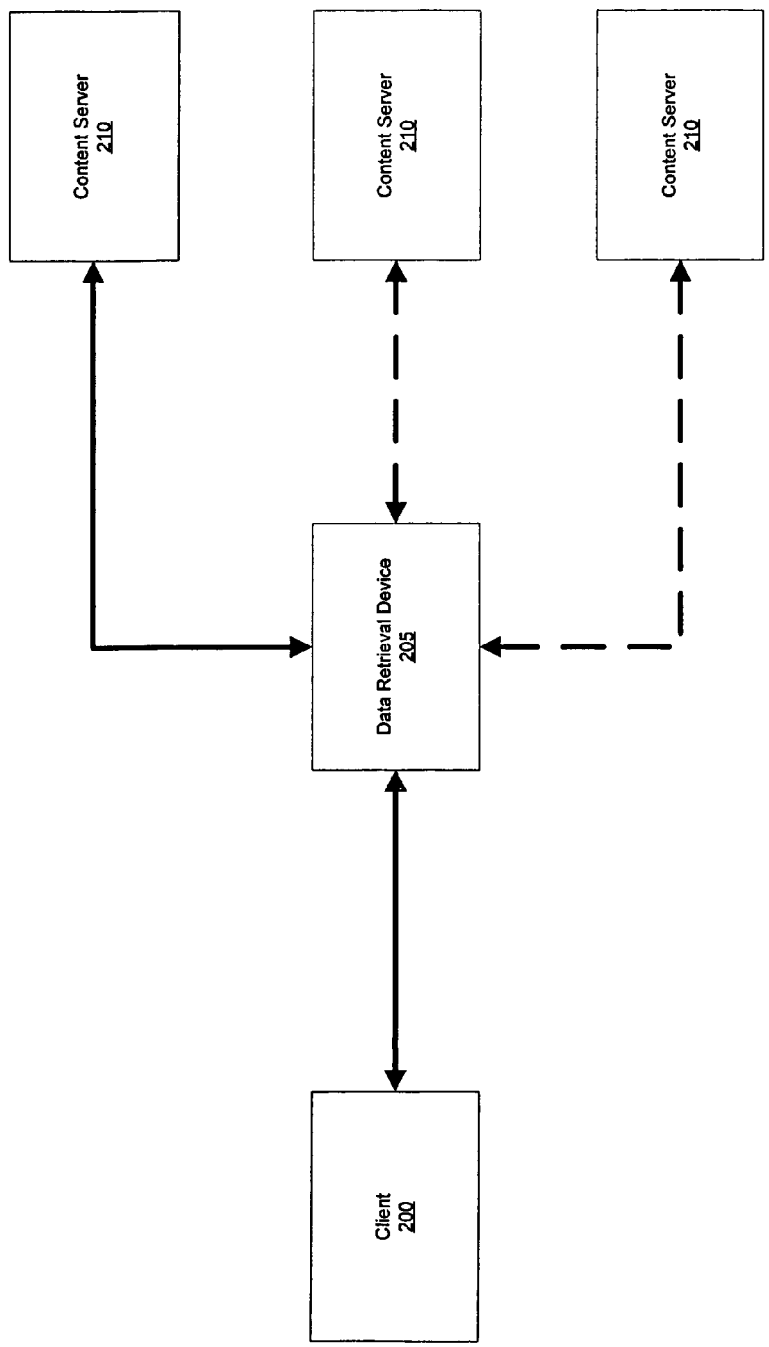
FIG. 2 is a block diagram that illustrates the components of an example embodiment of the physical architecture of the present invention.

FIG. 2 is a block diagram that illustrates an example embodiment of the physical architecture of the present invention. Data retrieval device 205 may be in communication with one or many content servers 210. The transaction data may be sent piecemeal, e.g., between a content server 210 and data retrieval device 205, and/or between data retrieval device 205 and client 200. For example, the principal content element may be initially sent. The client 200 may subsequently send further continuous requests for the rest of the content elements. These further requests are generated by the URLs embedded within the principal content element, and are directed to the locations to which the embedded URLs point. Alternatively, client settings may be set to send all of the further requests to data retrieval device 205. Data retrieval device 205 may then return the requested content elements from data retrieval device 205's cache if the requested content elements are in cache. If the content elements are not in cache, data retrieval device 205 may forward the content element requests to content server 210.

Content server 210, before transmitting content elements, may be initialized to operate in a stateless or a stateful mode. In the stateless mode, each request for a content element may be treated independently of requests of other content elements. In a stateful mode, all continuous requests for a principal content element and its sub-content elements may be treated as a single transaction.

When content server 210 is initialized to provide data in a stateful mode, content server 210 may not be able to respond to an independent request for a particular content element, where the request is disassociated from a transaction. For content server 210 to respond to the independent request for the particular content element, initialization of content server 210 to operate in the stateless mode may be necessary. Without a stateless mode initialization, content server 210 may return an error message.

If client 200 requests content elements from data retrieval device 205 in a stateful mode, data retrieval device 205 may request the content elements from content server 210 in the stateful mode. Content server 210 may then begin to transmit some of the content elements of the transaction to data retrieval device 205. As data retrieval device 205 receives content elements, data retrieval device 205 may add an entry in cache for each received content element.

Client 200 may terminate retrieval of content elements of the transaction before data retrieval device 205 receives all of the transaction content elements. Subsequently, data retrieval device 205 may receive a request in stateful mode, e.g., from the same and/or a different client 200, for content elements of the same transaction that had been previously requested and prematurely terminated. In response to the request, data retrieval device 205 may check its cache entries to determine whether content elements of the transaction are contained within cache. Upon inspection, data retrieval device 205 may find some content elements of the transaction and may begin to return cached content elements of the transaction to the client.

Due to the previous premature termination of the transaction, client 200 may request a content element of the transaction not contained in cache. To be able to fulfill client 200's requests, in an embodiment of the present invention, data retrieval device 205 may determine the validity of requested content elements before returning the requested content elements from cache to client 200.

Figure 3:
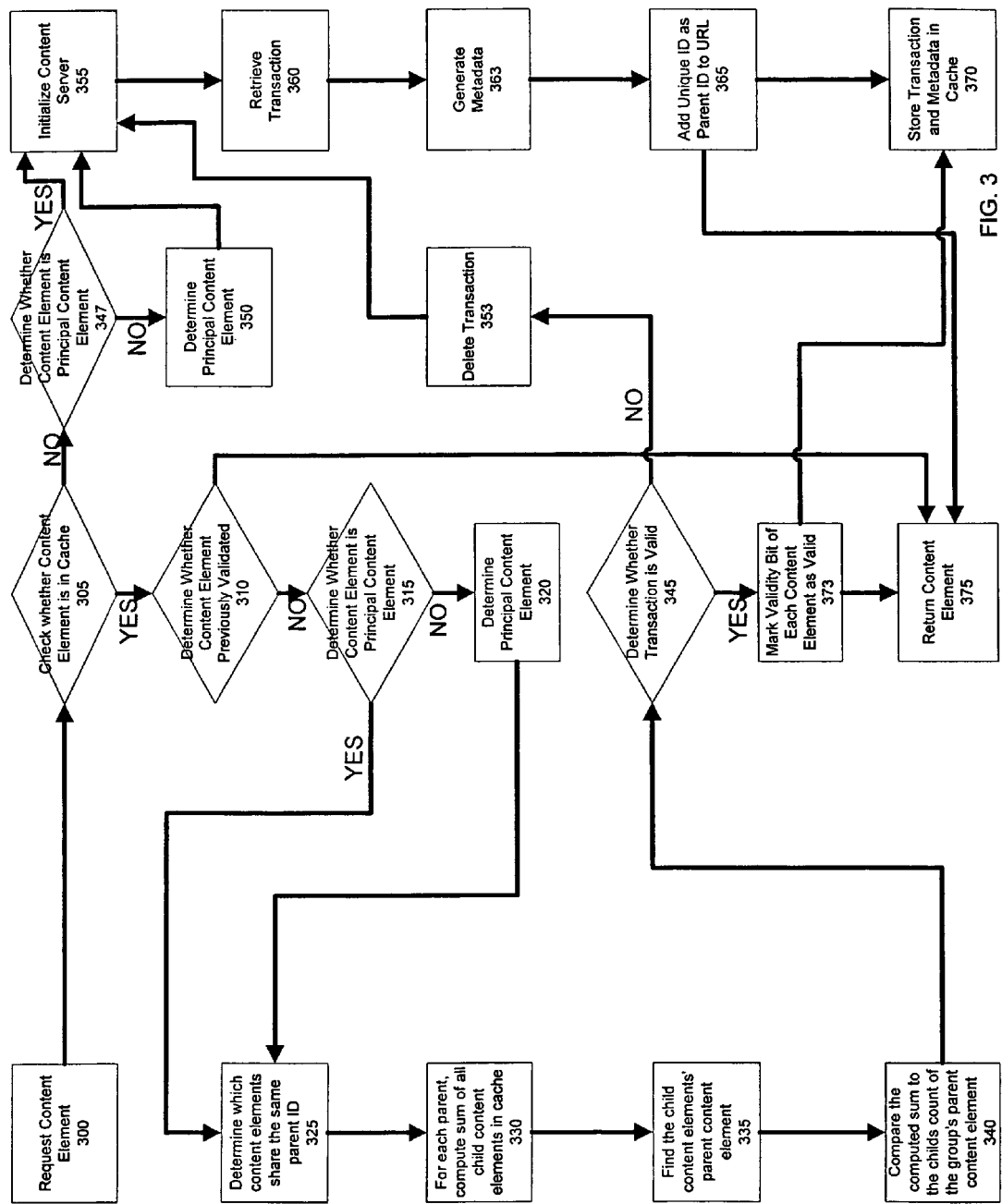
FIG. 3 is a flowchart that illustrates an example procedure in which a request for a content element of a transaction may be processed in the stateful mode, according to an embodiment of the present invention.

FIG. 3 is a flowchart that illustrates an example procedure in which a request for a content element may be processed in the stateful mode. In an embodiment of the present invention, after an initial request for a content element of a transaction in 300, the data retrieval device may, in 355, initialize the content server to transmit the transaction. In 360, the data retrieval device may retrieve the transaction, e.g., piecemeal, one content element at a time from the content server. The requests and the data may be transmitted using any communications protocol known in the art, e.g., hyper text transfer protocol (http). In 370, the data retrieval device may store the transaction in the cache memory.

In an embodiment of the present invention, in 363, the data retrieval device may generate metadata. In 370, the data retrieval device may store in cache the metadata for each content element it stores in cache. The metadata may describe each content element, e.g., to provide information about the hierarchy of the content elements of the transaction.

Figure 4:
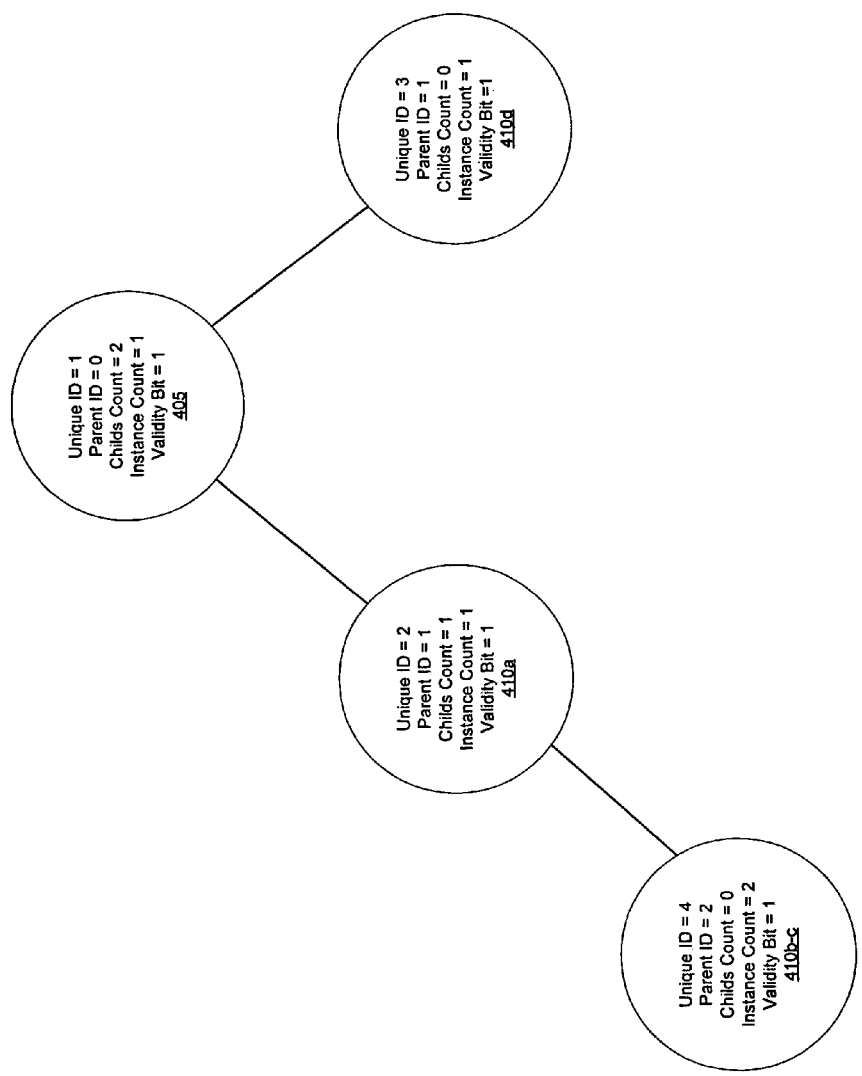
FIG. 4 is a hierarchy tree that illustrates the hierarchy representation of content elements, according to an embodiment of the present invention.

FIG. 4 is a hierarchy tree that illustrates the hierarchy representation of and the metadata for the content elements illustrated in FIG. 1. For a particular content element, the metadata may include a unique ID assigned to the content element; a parent ID, e.g., that indicates the ID of the content element in which the URL for the particular content element is embedded, i.e. the particular content element's parent content element; and a childs count that indicates the number content elements, the URL's of which are embedded within the particular content element. The principal content element 405's parent ID may be set to 0 since, as the principal content element, it is the parent content element of the rest of the transaction's content elements 410a-d.

In an embodiment of the present invention, a transaction may include a number of instances of a particular content element. For example, a transaction may include numerous instances of data that represents an image to form a border. When the data retrieval device stores the content elements in cache, the data retrieval device may store only one data representation of the image. According to this embodiment, metadata of a particular content element may additionally include an instance count that indicates the number of instances of the singly stored copy of the particular content element, contained within the transaction. For example, content element 410b-c that represents the two instances of content elements 110b and 110c, may be stored once in cache. Content element 410b-c's instance count may be set to 2, indicating that the singly stored content element 410b-c represents two content elements 110b and 110c of the same type.

In an embodiment of the present invention, metadata of a particular content element may include a validity bit. The validity bit may be set to "TRUE," e.g., 1, if it is determined that the content element is of a valid transaction. The validity bit may be set to "FALSE," e.g., 0, if it is determined that the content element is of an invalid transaction.

In an embodiment of the present invention, before the data retrieval device returns to a client a cached content element in 375, the data retrieval device may, in 325 to 340, analyze the metadata of the cached transaction with which the requested content element is associated to determine, in 345, whether the transaction, and by extension its associated content elements, stored in cache are valid. To perform the analysis, the data retrieval device may determine with which transaction the requested content element is associated. To make this determination, the data retrieval device may, in 315 to 320, determine which content element is the principal content element of the associated transaction. The associated transaction is then determined to be the principal content element and all subsequent child content elements. In 315, the data retrieval device may determine, from the parent ID of the requested content element, whether the requested content element is the associated transaction's principal content element. If, in 315, the data retrieval device determines that the requested content element is the principal content element of the associated transaction, the data retrieval device may proceed with the metadata analysis in 325 to 340. If, in 315, the data retrieval device determines that the requested content element is not the principal content element, the data retrieval device may, in 320, determine, from the parent IDs of the requested content element and any of the requested content element's parent content elements, the principal content element of the associated transaction.

In 325, the data retrieval device may check each content element's parent ID and determine which content elements share the same parent ID. In 330, for each parent content element referenced by the parent ID of a child content element, the data retrieval device may compute the sum of the child content elements stored in cache. In 335, for each parent content element referenced by the parent ID of a child content element, the data retrieval device may find the content element, the assigned unique ID of which matches the child content elements' parent ID, i.e., the child content elements' parent content element. In 340, for each parent content element referenced by the parent ID of a child content element, the data retrieval device may compare the computed sum to the childs count of the parent content element. If they are equal, in 345, the data retrieval device may determine that the transaction is valid, and is otherwise invalid. If, in 345, the data retrieval device determines that the transaction is valid, that data retrieval device may, in 373, mark the validity bit of each content element of the transaction as valid, e.g., change the validity bit from a default setting of 0 to 1. In 370, the data retrieval device may store the changed metadata, i.e. the changed validity bit value, in cache.

If, in 305, the data retrieval device determines that the client requested content element is stored within cache and, in 345, determines that the associated transaction is valid, the data retrieval device may, in 375, return to the client a copy of the cached requested content element.

In an embodiment of the present invention, if the data retrieval device determines, in 305, that the requested content element is stored in cache, the data retrieval device may determine, in 310, from the validity bit of the cached requested content element whether the requested content element had been previously validated. If the data retrieval device determines, in 310, that the content element had been previously validated, the data retrieval device may, in 375, return the content element without first analyzing the metadata of all of the content elements of the associated transaction in 325 to 340, and without determining, in 345, whether the associated transaction is valid.

If the data retrieval device determines in 305 that the requested content element is not stored in cache, or determines in 305 that it is stored in cache but also determines in 345 that it is not valid, the data retrieval device may, in 355, initialize the content server to transmit the associated transaction toward the data retrieval device. When it is determined that the requested content element is not stored in cache, to determine with which transaction the requested content element is associated, the data retrieval device may, in 347 and 350, make the same determinations as it does in 315 and 320. When it is determined that cached content elements of a transaction are not valid, the data retrieval device may, in 353, delete from cache all cache-stored content elements of the transaction. In 360, the data retrieval device may retrieve the transaction piecemeal, each content element at a time. In 363, the data retrieval device may generate metadata for each of the content elements as they are received, and may simultaneously or otherwise, in 375, return to the client the requested content element after the data retrieval device retrieves the requested content element. In 370, the data retrieval device may store in cache the transaction, e.g., each content element as it is received, and the corresponding metadata.

In an embodiment of the present invention, in 365, for each retrieved content element that includes a URL to another sub-content element, the data retrieval device may add the retrieved content element's generated unique ID to the sub-content element's URL. The unique ID added to the URL may serve as a parent ID of the sub-content element. According to this embodiment, in 375, the data retrieval device may return the requested content element only after the requested content element's unique ID has been added to the URLs embedded within the requested content element. According to this embodiment, when the data retrieval device receives a request for a content element, a cache key based at least in part upon the URL of the requested content element may be generated. The data retrieval device may use the cache key in 305 to determine whether the requested content element is stored in cache. The cache key may be further based on other data, e.g., settings of the data retrieval device. For example, settings of the data retrieval device may indicate that English language versions of requested content elements are to be retrieved. The cache key may accordingly point to an English version of the requested content element.

Figure 5:
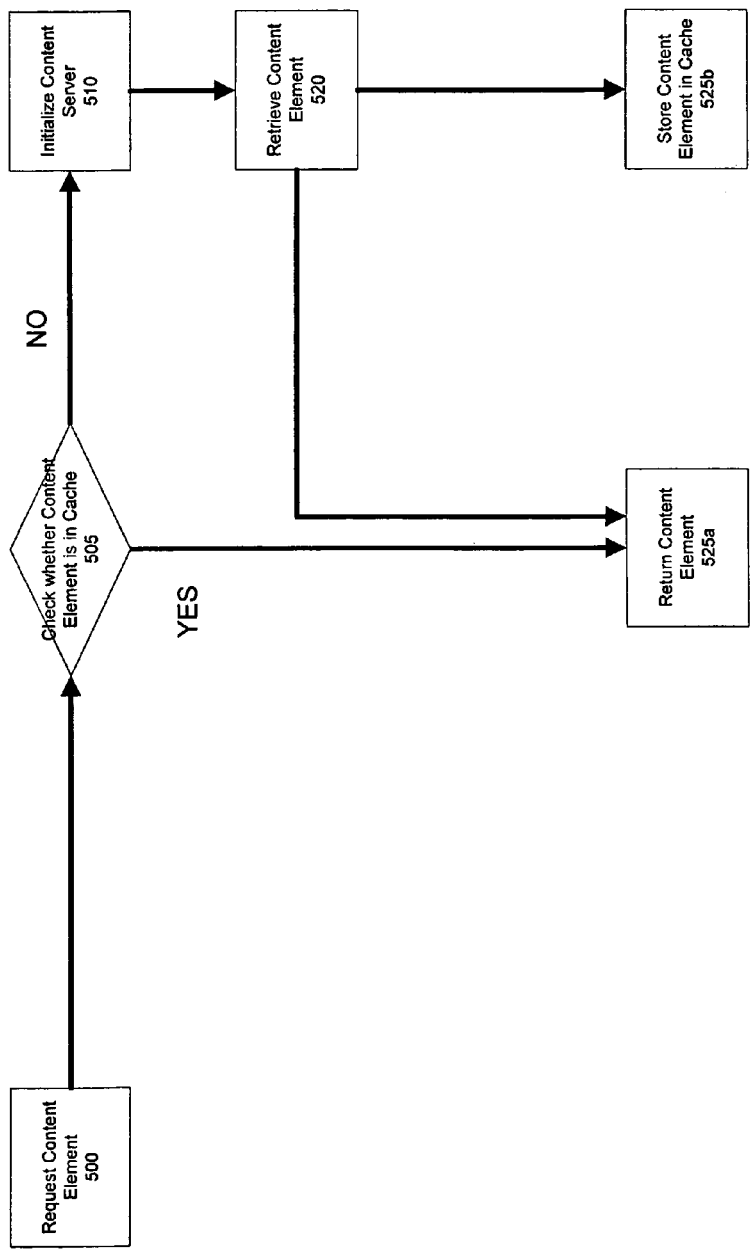
FIG. 5 is a flowchart that illustrates an example procedure in which a content element request may be processed in the stateless mode, according to an embodiment of the present invention.

FIG. 5 is a flowchart that illustrates an example procedure in which a content element request may be processed in the stateless mode. In an embodiment of the present invention, in 500, if a client requests of the data retrieval device a content element in a stateless mode, in which the content element is not associated with a transaction that includes a number of content elements, the data retrieval device may, in 505, check whether the requested content element is stored in cache. In 510, if the requested content element is not stored in cache, the data retrieval device may initialize the content server and, in 520, the data retrieval device may retrieve the content element from the content server. If the requested content element is stored in cache, in 525a, the data retrieval device may return the content element to the client without determining the validity of the content element.

According to an embodiment of the present invention, after the data retrieval device, in 520, retrieves the requested content element, the data retrieval device may, in 525b, store in cache the retrieved content element, without generating and storing metadata for the content element.

According to an embodiment of the present invention, data retrieval device 200 may be a proxy server. The proxy server may be provided, e.g., to filter data transmitted to the client, to cache requested transactions for faster response times to subsequent requests, or for any other use known in the art.

According to an embodiment of the present invention, data retrieval device 200 may be a portal, e.g., that aggregates data of a collection of content servers 210 to provide client 200 with focus in a search for data. According to this embodiment, data retrieval device 205 may perform tasks other than data retrieval. Data retrieval device 205 may actively seek relevant data and content servers 210. As one of its tasks, the portal may, for example, retrieve numerous transactions, each transaction from a different content server, and may integrate the retrieved transactions' content elements with and format the content elements for client 200's applications.

Figure 6:
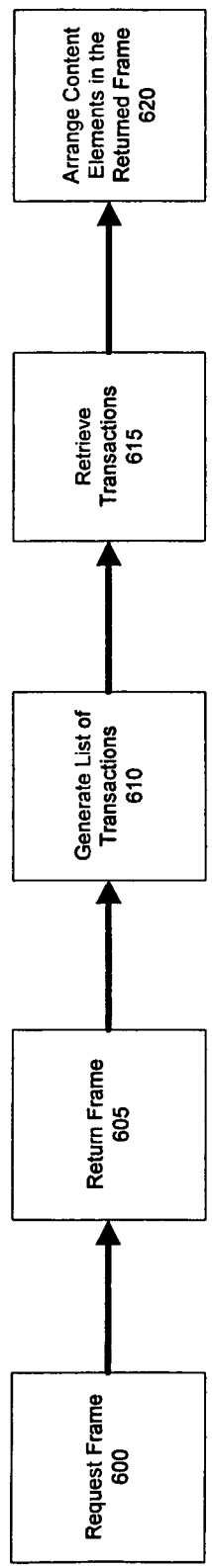
FIG. 6 is a flowchart that illustrates an example procedure for arranging a frame in response to a client request, according to an embodiment of the present invention.

FIG. 6 is a flowchart that illustrates an example procedure for arranging a frame in response to a client request. According to one embodiment of the present invention, a data retrieval device, e.g., portal, may include the additional capability to respond to a request for a frame, retrieve content elements of multiple transactions, and arrange the content elements in a single frame for the requesting client. In 600, a client may request a frame from the portal. A frame may be a collection of content elements of multiple transactions, e.g. grouped together in a web browser window. The transactions to be retrieved may be specified or unspecified by the client. In 605, in response to the frame request, the data retrieval device may transmit toward the client a frame. In 610, the data retrieval device may generate a list of transactions that pertain to the requested frame and may treat the frame request as multiple transaction requests. In 615, the data retrieval device may retrieve each of the requested transactions. According to this embodiment, in 620, when the data retrieval device returns the content elements, the data retrieval device may arrange the content elements within the returned frame.

According to an embodiment of the present invention, in 615, the data retrieval device may retrieve the transactions from a number of content servers, each transaction from a particular content server. In 620, the data retrieval device may arrange the content elements of all the transactions in a single frame.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A system for data retrieval comprising:
   a data retrieval device including a cache memory;
   the data retrieval device configured to:
   receive a request that (i) selectively requests only one of a plurality of content elements associated with a transaction and (ii) does not request any of the remaining content elements of the plurality of content elements associated with the transaction; and
   respond to the request by:
   (a) determining whether a copy of all of the plurality of content elements is stored in the cache memory;
   (b) returning the content element requested in the request from the cache memory conditional upon that it is determined in the determining step that the copy of all of the plurality of content elements is stored in the cache memory, so that:
   said requested content element is not returned, in response to the request, from the cache memory if it is determined in the determining step that the cache memory does not include the copy of all of the plurality of content elements, even if the requested content element is stored in the cache memory and even though the remaining content elements of the plurality of content elements associated with the transaction were not requested in the request; and
   (c) only if it is determined in the determining step that the cache memory does not include the copy, initiating a request for the transaction from a content server.

2. The system of claim 1, wherein the data retrieval device stores in the cache memory the transaction received from the content server, and metadata that describes each content element of the received transaction.

3. The system of claim 2,
   wherein the metadata of a stored content element includes an ID assigned to and unique to the stored content element, a parent ID that identifies the ID of the stored content element's parent, and a childs count, and
   wherein a number of child content elements is assignable to the stored content element, and the childs count is a value that represents the number.

4. The system of claim 3,
   wherein the transaction includes a plurality of parent content elements and a plurality of child content elements, each child content element assigned to one parent content element,
   wherein the data retrieval device is configured to compute, for each particular parent content element, the sum of all assigned child content elements that are stored in the cache memory, and to compare the sum to the childs count of the particular parent content element, and
   wherein the data retrieval device is configured to determine in a first determination that the copy is stored if, for each comparison performed for the transaction, the sum equals the childs count.

5. The system of claim 4,
   wherein the metadata includes a validation bit,
   wherein the data retrieval device is configured to set the validation bit of each content element of the transaction to indicate that the respective content element of the transaction is valid only if the data retrieval device determines in the first determination that the copy is stored,
   wherein the data retrieval device is configured to determine in a second determination that the copy is stored if the validation bit of the requested content element is set to indicate that the requested content element is valid, and
   wherein, in response to the request, the data retrieval device performs the second determination and returns the requested content element without performance of the first determination only if the copy is determined to be stored in the second determination.

6. The system of claim 3, wherein the stored content element's parent ID is set to 0 upon a condition that the stored content element's content element does not have a parent content element.

7. The system of claim 3,
   wherein, even if the transaction contains multiple instances of the requested content element, the data retrieval device stores in the cache memory only one copy of the requested content element, and
   wherein the metadata of the requested content element includes an instance count that indicates the number of instances of the requested content element.

8. The system of claim 3,
   wherein the data retrieval device is configured to determine the identity of the transaction, and
   wherein in order to make the identity determination, the data retrieval device determines a principal content element of the requested content element.

9. The system of claim 8, wherein the requested content element is the principal content element.

10. The system of claim 2, wherein the data retrieval device stores the metadata only if the each content element is received in a stateful mode.

11. The system of claim 2, wherein the determination is conducted upon a condition that the requested content element is requested in a stateful mode.

12. The system of claim 1, wherein the data retrieval device is a proxy server.

13. The system of claim 1, wherein the data retrieval device is a portal.

14. The system of claim 13, wherein the data retrieval device is configured to retrieve transactions from multiple content servers for arrangement within a single frame.

15. A system for caching transactions comprising:
    a data retrieval device configured to store in a cache memory a copy of a received transaction, and to generate and store metadata for each of a plurality of content elements of the copy of the received transaction, wherein, upon receipt of a request that (i) selectively requests only one of the plurality of content elements of the transaction and (ii) does not request any of the remaining content elements of the plurality of content elements of the transaction, the data retrieval device responds to the request by:

(a) determining whether the cache memory has stored therein the copy of the transaction including all of the plurality of content elements of the transaction; and (b) returning a copy of the content element requested in the request from the cache memory conditional upon that it is determined in the determining step that the cache memory has stored therein the copy of the transaction including all of the plurality of content elements of the transaction, so that:

said requested content element is not returned, in response to the request, from the cache memory if it is determined in the determining step that the cache memory does not include therein the copy of the transaction including all of the plurality of content elements of the transaction, even if the requested content element is stored in the cache memory and even though the remaining content elements of the plurality of content elements of the transaction were not requested in the request; and wherein the data retrieval device determines whether the stored copy includes all of the plurality of content elements of the transaction based on the metadata of the stored copy.

16. The system of claim 15, wherein the metadata includes an ID assigned to and unique to a corresponding content element, a parent ID that identifies the ID of the corresponding content element's parent, a childs count, and a validation bit, wherein a number of child content elements is assignable to the corresponding content element, and the childs count is a value that represents the number, wherein the transaction includes a plurality of parent content elements and a plurality of child content elements, each child content element assigned to one parent content element, wherein the data retrieval device determines in a first determination that the stored copy includes all of the plurality of content elements of the transaction if the validation bit of the requested content element is set to indicate that the requested content element is valid, wherein, if the validation bit of the requested content element is not set to indicate that the requested content element is valid, the data retrieval device, in a second determination, computes, for each particular parent content element, the sum of all assigned child content elements that are stored in the cache memory, compares the sum to the childs count of the particular parent content element, and determines that the stored copy includes all of the plurality of content elements of the transaction only if, for each comparison performed for the stored copy, the sum equals the childs count, and wherein, in the second determination, the data retrieval device sets the validation bit of each content element of the transaction to indicate that each content element is valid, only if the data retrieval device determines, in the second determination, that the stored copy includes all of the plurality of content elements of the transaction.

17. A method for data retrieval comprising:

receiving a request that (i) selectively requests only one of a plurality of content elements associated with a transaction and (ii) does not request any of the remaining content elements of the plurality of content elements associated with the transaction; and responding to the by:

(a) determining whether a copy of all of the plurality of content elements is stored in a cache memory;

(b) returning the content element requested in the request from the cache memory conditional upon that it is determined in the determining step that the copy of all of the plurality of content element is stored in the cache memory, so that:

said requested content element is not returned, in response to the request, from the cache memory if it is determined in the determining step that the cache memory does not include the copy of all of the plurality of content elements, even if the requested content element is stored in the cache memory and even though the remaining content elements of the plurality of content elements associated with the transaction were not requested in the request; and (c) initiating a request for the transaction from a content server only if it is determined in the determining step that the cache memory does not include the copy.

18. The method of claim 17, further comprising:

storing in the cache memory the transaction received from the content server; and storing in the cache memory metadata that describes each content element of the received transaction.

19. The method of claim 18, wherein the metadata of a stored content element includes an ID assigned to and unique to the stored content element, a parent ID that identifies the ID of the stored content element's parent, and a childs count, and wherein a number of child content elements is assignable to the stored content element, and the childs count is a value that represents the number.

20. The method of claim 19, wherein the transaction includes a plurality of parent content elements and a plurality of child content elements, each child content element assigned to one parent content element, further comprising:

computing, for each particular parent content element, the sum of all assigned child content elements that are stored in the cache memory;

comparing, for each particular parent content element, the sum to the childs count of the particular parent content element; and determining in a first determination that the copy is stored if, for each comparison performed for the transaction, the sum equals the childs count.

21. The method of claim 20, wherein the metadata includes a validation bit, further comprising:

determining in a second determination that the copy is stored if a validation bit of the requested content element is set to indicate that the requested content element is valid; and setting the validation bit of each content element of the transaction to indicate that the respective content element of the transaction is valid only if the copy is determined to be stored in the first determination, wherein, in response to the request, the second determination is performed and the requested content element is returned without performing the first determination, only if the copy is determined to be stored in the second determination.

22. The method of claim 19, further comprising:
setting the stored content element's parent ID to 0 upon a condition that the stored content element does not have a parent.

23. The method of claim 19,
wherein even if the received transaction contains multiple instances of the requested content element, only one copy of the requested content element is stored in the cache memory, and
wherein the metadata of the requested content element includes an instance count that indicates the number of instances of the requested content element.

24. The method of claim 19, further comprising:
determining the identity of the transaction,
wherein, in order to make the identity determination, a principal content element of the requested content element is determined.

25. The method of claim 24, wherein the requested content element is the principal content element.

26. The method of claim 18, wherein the metadata is stored only if the each content element is received in a stateful mode.

27. The method of claim 18, wherein the determination is conducted upon a condition that the requested content element is requested in a stateful mode.

28. An article of manufacture comprising a computer-readable medium having stored thereon instructions adapted to be executed by a processor, the instructions which, when executed, define a series of steps to be used for data retrieval comprising:

receiving a request that (i) selectively requests only one of a plurality of content elements associated with a transaction and (ii) does not request any of the remaining content elements of the plurality of content elements associated with the transaction; and
responding to the by:
  (a) determining whether a copy of all of the plurality of content elements is stored in a cache memory;
  (b) returning the content element requested in the request from the cache memory conditional upon that it is determined in the determining step that the copy of all of the plurality of content element is stored in the cache memory, so that:
    said requested content element is not returned, in response to the request, from the cache memory if it is determined in the determining step that the cache memory does not include the copy of all of the plurality of content elements, even if the requested content element is stored in the cache memory and even though the remaining content elements of the plurality of content elements associated with the transaction were not requested in the request; and
  (c) initiating a request for the transaction from a content server only if it is determined in the determining step that the cache memory does not include the copy.

29. The method of claim 20, further comprising:
deleting from the cache memory all ones of the plurality of content elements previously stored in the cache memory if, for any one of the comparisons performed for the transaction, the sum and the childs count are unequal.

\* \* \* \* \*